Feb. 14, 1933.  G. E. A. HALLETT  1,897,934
REAR WHEEL ARRANGEMENT FOR MOTOR BUSSES
Filed April 5, 1926
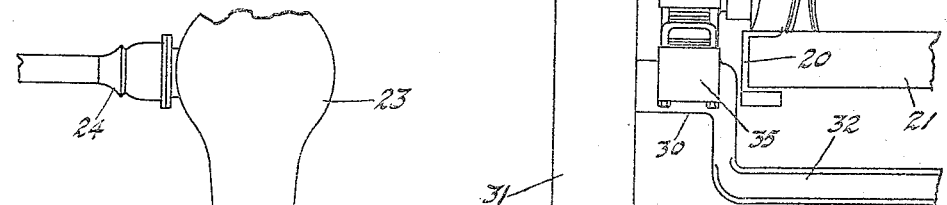
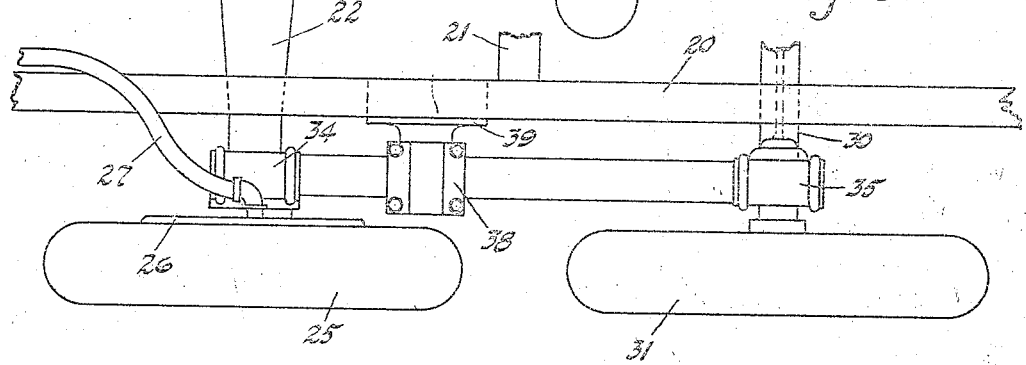
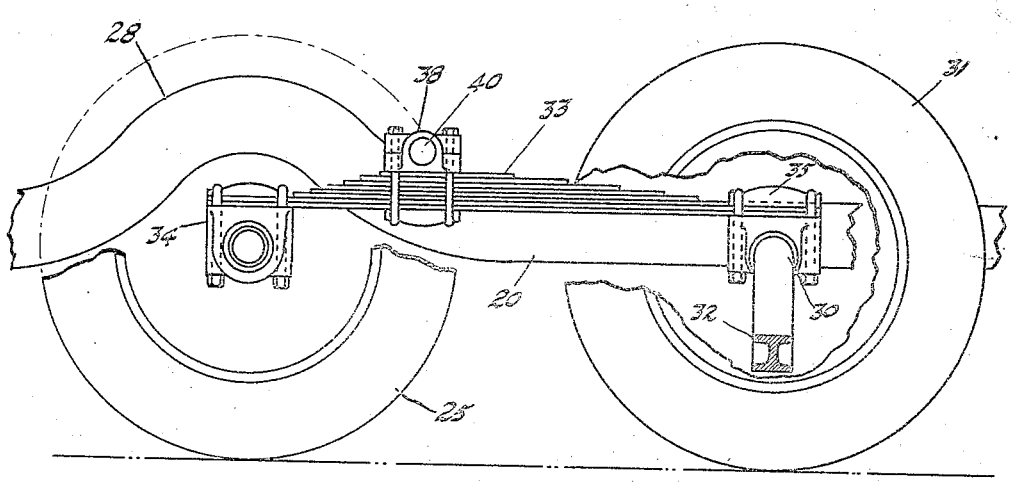
Inventor
GEORGE E. A. HALLETT
By Blackmore, Spencer & Heil
Attorneys Patented Feb. 14, 1933

1,897,934

UNITED STATES PATENT OFFICE

GEORGE E. A. HALLETT, OF DETROIT, MICHIGAN, ASSIGNOR TO GENERAL MOTORS RESEARCH CORPORATION, OF DETROIT, MICHIGAN, A CORPORATION OF DELAWARE

REAR WHEEL ARRANGEMENT FOR MOTOR BUSSES

Application filed April 5, 1926. Serial No. 99,880.

This invention relates to improvements in motor vehicles and more particularly to the chassis or running gear of six wheel motor busses.

One of the objects of the present invention is to increase the factor of safety in a motor vehicle by reducing the possibilities of side sliding, commonly called "skidding".

Another object of the present invention is to distribute the load of the vehicle body on the rear running gear in such a manner as to obtain the maximum of riding comfort.

A still further object is to so distribute the load of the body on the rear, four-wheel running gear that a comparatively short turning radius may be had with a minimum amount of slipping of the tires on said running gear.

Another object is to simplify the structure that it may be produced commercially at a substantially low cost.

Further objects and advantages of the present invention will be apparent from the following description, reference being had to the accompanying drawing, wherein a preferred form of embodiment of the present invention is clearly shown.

In the drawing:

Fig. 1 is a fragmentary plan view of a vehicle chassis.

Fig. 2 is a side elevation of the portion shown in Fig. 1.

Fig. 3 is a fragmentary elevation taken from the rear of Fig. 1.

Referring to the drawing, the numeral 20 designates one of the side members of the motor vehicle frame having transverse braces 21 which secure the two side members of the frame together.

The driving axle of the vehicle is designated by the numeral 22. Said axle is provided with the usual differential housing portion 23 to which is connected the torque tube 24 which encloses the drive shaft connected to the engine, not shown. On each end of this axle there is provided a driving wheel 25, one only being shown. These drive wheels are each provided with a braking element 26 which may be of any suitable type. For the sake of illustration, a hydraulic brake is shown, the pipe 27 leading the motion transmitting fluid to the brake.

In the Fig. 2, the center of the axle is shown to be substantially in the plane of the side members of the frame. In order to provide clearance between the frame and driving axle and to permit motion of the frame up and down due to spring action to be later described, the side members of the frame are provided with arched portions 28, substantially concentric with the axis of the axle when only the load of the vehicle itself is on the springs mentioned.

Spaced rearwardly from the driving axle, as regards the motor vehicle, there is provided a dead axle 30, parallel to the driving axle. This dead axle is also provided with wheels 31 at its extremities and arranged in tandem relation with the driving wheels. As shown in Fig. 3, this axle may be underslung as at 32 to provide clearance for the vehicle frame when it moves downwardly due to weight or rough roadways.

The means for connecting the two axles 22 and 30 comprises springs 33 made up of a plurality of blades. In Fig. 1 only one of these springs is shown; however, the opposite ends of the axles are also bound together by such a spring.

The ends of the springs are anchored to brackets 34 and 35, the former being pivotally supported on its axle 22 while the bracket 35 is secured to its axle 30 in any suitable manner.

The means for securing the frame or, more specifically, the side members 20 of the frame to their respective springs 33 comprises a bracket including two members 38 and 39 pivotally secured together by means of the pivot pin 40 which, when the bracket is in position on the vehicle chassis, has its axis parallel with the axles 22 and 30. The member 38 of the bracket is secured to the spring 33 in any suitable manner at a point, however, closer to the driving axle 22 than to the driven axle 30. The most satisfactory position for the member 38, in chassis for certain types of busses or vehicles, has been found to be about one-third the distance between the driving and driven axles. Such an arrangement so distributes the load that the driving wheels 25 which require good traction will carry a greater portion of said load while the trailing wheels will carry the lesser portion of the load and have sufficient road contact to prevent side slipping or "skidding" when the brakes on the driving wheels have a tendency to lock said wheels.

This arrangement also eliminates the costly inter-drive between the two axles which would include a second differential. It also reduces the number of chains necessary when slippery roads require drive wheels to be chained.

Anchoring the frame on the springs, nearer the driving axle, reduces the turning radius and also tends to reduce necessary slipping of the drive wheels, which carry the heavier load, when a turn is made. On the other hand the wheels that are farthest from the center of the vehicle and which will slip the most in a turn, are comparatively lightly loaded, thus the wear on the tires of both driving and trailing wheels is held to a minimum.

This structure also permits a comparatively long body frame to be used. Due to the tandem relation of the wheels, the size of the wheel pockets in the body are comparatively smaller than in bodies where the wheels are arranged side by side.

While the form of embodiment of the present invention as herein disclosed, constitutes a preferred form, it is to be understood that other forms might be adopted, all coming within the scope of the claim which follows.

What is claimed is as follows:

A motor vehicle chassis comprisng a frame having side members, two parallel frame supporting axles at the rear, the forward of said two axles being a driving axle, and the rear one underslung and dead; leaf springs bridging the space between and having their ends attached to said axles; said side members extending over the depending part of the underslung dead axle and having arched portions over the driving axle; and supporting connections between the frame side members and the springs nearer to the driving than to the dead axle.

In testimony whereof I affix my signature.

GEORGE E. A. HALLETT.